US 12,454,247 B2

(12) United States Patent
Chanal et al.

(10) Patent No.: US 12,454,247 B2
(45) Date of Patent: Oct. 28, 2025

(54) ADAPTIVE METHOD FOR ACTIVATING A VEHICLE FUNCTION AND ASSOCIATED ADAPTIVE ACTIVATION DEVICE

(71) Applicant: Continental Automotive Technologies GmbH, Hannover (DE)

(72) Inventors: Sébastien Chanal, Toulouse (FR); Mohamed Cheikh, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 73 days.

(21) Appl. No.: 18/515,965

(22) Filed: Nov. 21, 2023

(65) Prior Publication Data

US 2024/0174200 A1 May 30, 2024

(30) Foreign Application Priority Data

Nov. 24, 2022 (FR) ...................................... 2212283

(51) Int. Cl.
*B60R 25/24* (2013.01)
*G01S 5/14* (2006.01)

(52) U.S. Cl.
CPC ............ *B60R 25/245* (2013.01); *G01S 5/145* (2013.01); *B60R 2325/205* (2013.01)

(58) Field of Classification Search
CPC .. B60R 25/245; B60R 2325/205; G01S 5/145
See application file for complete search history.

(56) References Cited

U.S. PATENT DOCUMENTS 9,886,805 B1 * 2/2018 Bianchi, III ....... G07C 9/00309
10,803,687 B1 * 10/2020 Khamis ............. G07C 9/00309
2018/0217229 A1 * 8/2018 Shukla .................... G01S 17/42
(Continued)

FOREIGN PATENT DOCUMENTS

FR 3119465 A1 8/2022
FR 3121774 A1 10/2022

*Primary Examiner* — Thomas D Alunkal
(74) *Attorney, Agent, or Firm* — Buchanan Ingersoll & Rooney PC

(57) ABSTRACT

An adaptive method for activating a vehicle function using a user's portable device and communicating in ultra-wideband with the vehicle. The function being activated based on the portable device's location by applying a predictive model trained beforehand using pairs of predetermined received signal strength values and predetermined time-of-flight values from a plurality of reference portable devices, and using authentication of the portable device, the method: establishing beforehand a bijective function linking the received signal strength values and the time-of-flight values; then: for a plurality of direct signals received from a new portable device: establishing a new bijective function; using each new pair of values for time-of-flight and received signal strength; calculating a received signal strength difference between the two bijective functions; applying the difference to the training received signal strength values; determining the location of the new portable device using the new pairs of received signal strength and time-of-flight values and by applying the modified predictive model; activating the vehicle function according to the location.

10 Claims, 6 Drawing Sheets

(56) References Cited

U.S. PATENT DOCUMENTS

2021/0246693 A1\* 8/2021 Elangovan .............. G06F 21/44
2022/0292388 A1\* 9/2022 Elangovan ......... G07C 9/00309
2022/0322029 A1\* 10/2022 Smith ................... H04W 4/023

\* cited by examiner

Fig. 3
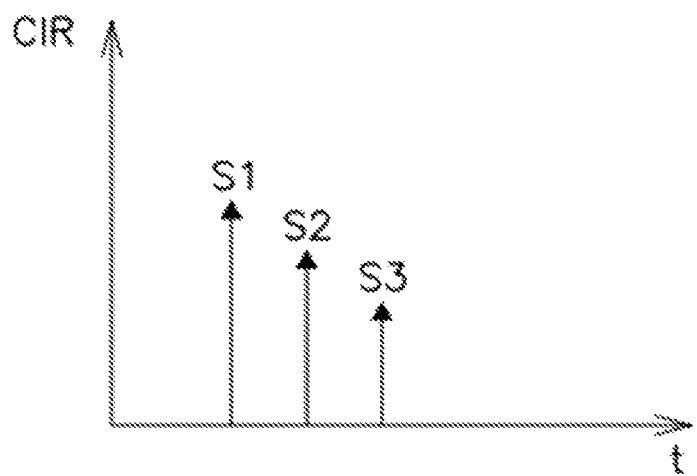
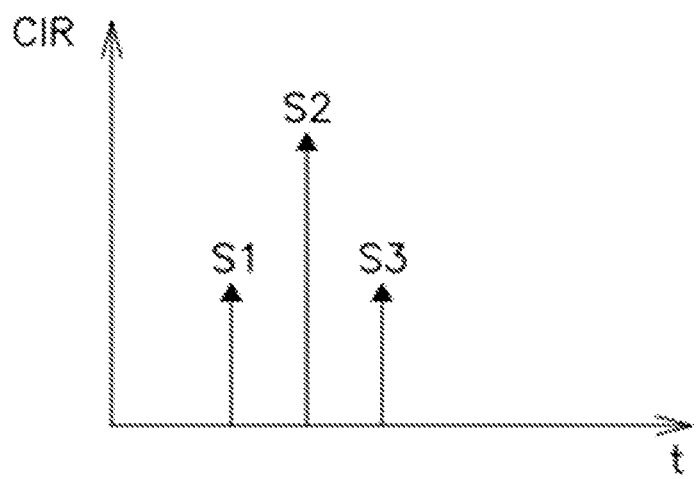

ADAPTIVE METHOD FOR ACTIVATING A VEHICLE FUNCTION AND ASSOCIATED ADAPTIVE ACTIVATION DEVICE

CROSS REFERENCE TO RELATED APPLICATIONS

This application claims priority to French Patent Application No. 2212283, filed Nov. 24, 2022, the contents of such application being incorporated by reference herein.

FIELD OF THE INVENTION

The present invention relates to the field of motor vehicles and more specifically relates to an adaptive method for activating a function of a motor vehicle, and to an associated adaptive activation device. The invention particularly, although not solely, applies to the function of locking and unlocking the opening elements of a motor vehicle.

BACKGROUND OF THE INVENTION

A "hands-free" access system for accessing a motor vehicle allows an authorized user to lock and/or unlock the opening elements of their vehicle without having to physically press buttons on a key. For this purpose, the vehicle identifies a portable device such as a badge or a remote control worn or carried by the user and, if the badge or the remote control is located within a predetermined zone around the vehicle or in the vehicle and is identified as belonging to the vehicle, then the vehicle automatically locks/unlocks its opening elements according to the user's intention, without the user having to physically handle a key.

To this end, when the user approaches the vehicle, communication is established over a generally radiofrequency wireless communication link between the portable device and an activation device on board the vehicle in order to authenticate said portable device by way of its identifier and to locate it with respect to the vehicle.

Nowadays, however, it is increasingly common to use a cell phone to perform authentication functions, which makes it possible to avoid using a dedicated electronic badge and thus to limit the number of devices. Since most cell phones do not have radiofrequency communication means, it therefore becomes necessary to adapt the "hands-free" access and/or starting system for a vehicle so that it is also able to work with a cell phone equipped with other communication standards, such as for example ultra-wideband. Ultra-wideband (UWB) is a radio modulation technique that is based on the transmission of pulses with a very short duration, often of less than one nanosecond. Thus, the bandwidth can reach very high values.

However, locating the portable device using ultra-wideband has some disadvantages: the conventional method involves using the strength of the signal received by the portable device in order to determine the distance between the portable device and the vehicle. However, in an automotive environment, the ultra-wideband signal is generally transmitted by taking several propagation paths between the portable device and the antenna of the vehicle. Thus, the signals can become attenuated because they have been reflected by one or more metal walls before being received.

Another method of the prior art uses the time-of-flight of the signal between the portable device and the antennas of the activation device which are located on the vehicle, in order to estimate the distance between the two. Then, triangulation or trilateration methods using at least three antennas located on the vehicle allow the position of the portable device to be determined. However, there is a significant error rate in the measurement of the time-of-flight (in this case due to the reflections experienced by the signal) and this deteriorates the quality of the location of the portable device and generates a high degree of inaccuracy with respect to the final determination of the positioning of said portable device with respect to the vehicle.

Finally, one known alternative is to use the two parameters together, which is to say the pair of values: the strength of the received signal and the time-of-flight of the same signal, using a predictive artificial intelligence model trained beforehand using pairs of strength and time-of-flight values originating from test portable devices and associated with location values during a prior learning phase.

This method however has the major disadvantage that the predictive model is trained using pairs of values that have been measured during tests conducted with reference portable devices which of course have already been marketed and are commercially available.

Thus, it is not possible to determine how the model will react with pairs of new values originating from new models of portable device which have yet to reach the marketplace and for which it has not been trained.

More particularly, it is known that the value of the power of the signal received for one same location may fluctuate considerably from one portable device to another.

It is therefore necessary to be able to accurately determine the location of the portable device relative to the vehicle using ultra-wideband using any type of the present-day or future portable device in order to activate the one or more appropriate functions.

An aspect of the invention proposes an adaptive method for activating a vehicle function and an associated adaptive activation device allowing the disadvantages of the prior art to be overcome, in this case allowing the location of the portable device relative to the vehicle to be accurately determined using new portable devices by adapting dynamically to suit the characteristics thereof, in order to activate the corresponding vehicle function at the location of said portable device.

SUMMARY OF THE INVENTION

An aspect of the invention proposes an adaptive method for activating a vehicle function using a portable device worn or carried by a user and communicating in ultra-wideband with the vehicle, the function being activated on the basis of a location of the portable device with respect to the vehicle and of authentication of the portable device, the portable device being located using the strength of a signal received by the portable device and using the time-of-flight of a signal exchanged between the portable device and the vehicle and by applying a predictive model trained beforehand using pairs of predetermined received signal strength values and predetermined time-of-flight values from a plurality of reference portable devices, the method being notable in that:
  a. a bijective function linking the predetermined received signal strength values and predetermined time-of-flight values used for training the model is established beforehand,
and in that the method comprises the following steps:
  b. for a plurality of signals received from a new portable device, if said received signals are direct signals, then:

c. a new bijective function is established, using each new pair of values for time-of-flight and received signal strength,
d. a received signal strength difference representing the difference between the two bijective functions, for the same time-of-flight, is calculated,
e. said difference is applied to the received signal strength values of the pairs of predetermined values used for training the model,
f. the location of the new portable device is determined using the new pairs of received signal strength and time-of-flight values and by applying the predictive model thus modified,
g. the vehicle function is activated according to the location thus determined.

In a preferred embodiment of the method the signal received by an antenna of an emitter-receiver unit and originating from the new portable device is a direct signal if, at least:
a. said signal is a first signal of maximum strength, and
b. an angle of arrival of said signal is comprised within a window of predetermined angle values.

In a second embodiment, a signal is direct if, further, an orientation of the new portable device with respect to the vehicle upon the emission of said signal is comprised within a window of predetermined orientation values.

In a third embodiment, a signal is direct if, further, the time-of-flight of said signal is below a maximum time-of-flight.

An aspect of the invention also relates to any adaptive device for activating a vehicle function, intended to be fitted on board a vehicle and communicating in ultra-wideband with a portable device worn or carried by a user, the function being activated on the basis of a location of the portable device with respect to the vehicle and of authentication of the portable device, the portable device being located using the strength of a signal received by the portable device and using the time-of-flight of a signal exchanged between the portable device and the vehicle and by applying a predictive model trained beforehand using pairs of predetermined received signal strength values and predetermined time-of-flight values from a plurality of reference portable devices, the device being notable in that it is further suited to:
a. establishing a bijective function linking the predetermined received signal strength values and predetermined time-of-flight values used for training the model,
b. determining whether a received signal is a direct signal, and, for a plurality of direct signals received from a new portable device:
c. establishing a new bijective function, using each new pair of values for time-of-flight and received signal strength,
d. calculating a received signal strength difference representing the difference between the two bijective functions, for the same time-of-flight,
e. applying said difference to the received signal strength values of the pairs of predetermined values used for training the model,
f. determining the location of the new portable device using the new pairs of received signal strength and time-of-flight values and by applying the predictive model thus modified,
g. activating the vehicle function according to the location thus determined.

In the preferred embodiment, the device is suited to:

a. determining whether a first signal received by an antenna of an emitter-receiver unit is of maximum strength,
b. comparing an angle of arrival of said signal against a window of predetermined angle values.

In the second embodiment, the device is further suited to receiving an orientation of the new portable device and verifying that said orientation is comprised within a window of predetermined orientation values.

In a third embodiment of the invention, the device is further suited to comparing the time-of-flight of a received signal against a maximum time-of-flight value.

An aspect of the invention also relates to any computer program product, comprising program code instructions for executing the steps of the method according to any one of the features listed above, when said program is executed on a computer.

Finally, an aspect of the invention applies to any motor vehicle comprising an adaptive activation device for activating a vehicle function according to any one of the aforementioned features.

BRIEF DESCRIPTION OF THE DRAWINGS

Other features and advantages of aspects of the invention will become more clearly apparent on reading the description which follows. This description is purely illustrative and should be read with reference to the accompanying drawings, in which:

FIG. 3 is a graph illustrating the first criterion, namely the received signal strength as a function of time, also known as the "Channel Impulse Response", or CIR, the two distinct signals, a signal said to be "direct" and a signal said to be "indirect" between the portable device and an emitter-receiver of the vehicle;

DETAILED DESCRIPTION OF THE PREFERRED EMBODIMENTS

Figure 1:
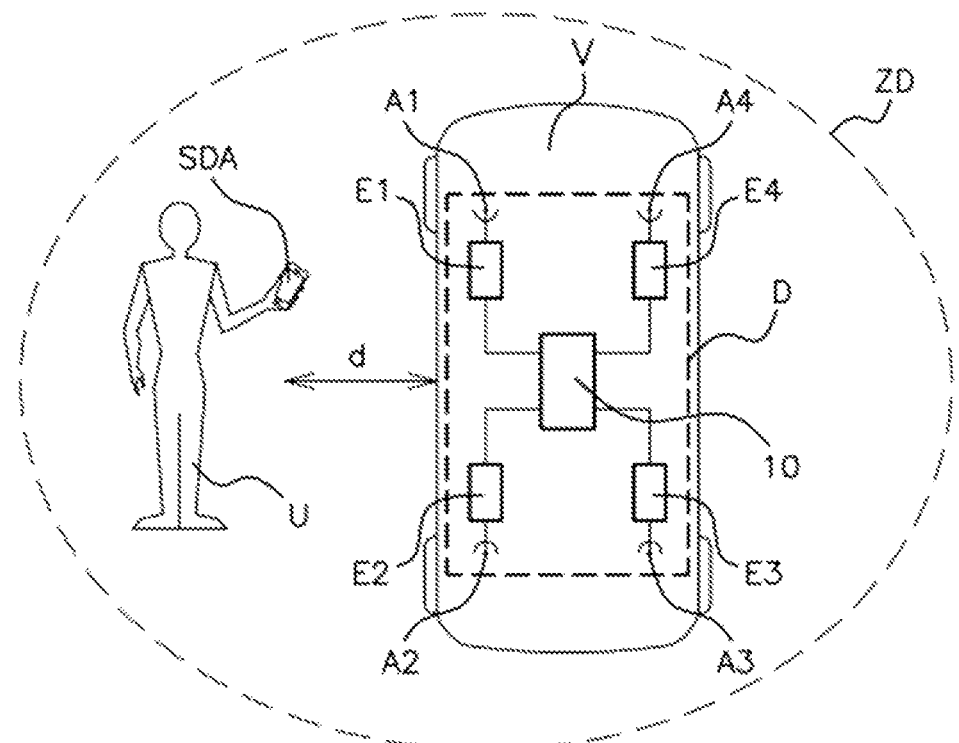
FIG. 1 schematically depicts a vehicle equipped with an adaptive device for activating a vehicle function.

FIG. 1 shows a motor vehicle V equipped with an adaptive device D for activating a vehicle function according to an aspect of the invention.

The adaptive activation device D communicates in ultra-wideband UWB with a portable device SDA worn or carried by a user U.

Ultra-wideband communication is a radio modulation technique that is based on transmitting pulses of very short duration, often less than one nanosecond, over a broad frequency spectrum. The bandwidth may thus reach very large values. UWB is generally considered to need to have a bandwidth-to-central frequency ratio of at least 20%, or a bandwidth of 250 MHz or more.

The portable device SDA may be a smart cell phone equipped with ultra-wideband communication means.

The adaptive activation device D can be used for activating certain vehicle functions such as the unlocking or locking of the opening elements of the vehicle V, according to the location d of the portable device SDA in a predetermined zone ZD around the vehicle V and according to the result of the authentication of said portable device SDA.

To this end and in a way known per se, the device D comprises a plurality of emitter-receiver units, at least two units, FIG. 1 illustrates by way of example four units E1, E2, E3, E4 installed on board the vehicle.

Each of said units E1 . . . E4 is equipped with an ultra-wideband communication antenna A1, A2, A3, A4 of an ultra-wideband emitter-receiver, and is connected to an electronic control unit 10 installed on board the vehicle V.

The units E1 . . . E4 may thus, over ultra-wideband, receive data originating from the portable device SDA.

The electronic control unit 10 activates the vehicle functions in accordance with or by virtue of the data received by the emitter-receiver units E1, E2, E3, E4.

This method for activating a vehicle function is known to those skilled in the art.

One known activation method consists in using two parameters:
 a. The time-of-flight TOF of a signal exchanged between the portable device SDA and at least two emitter-receiver units,
 b. The strength RSS (Received Signal Strength) of the signal received by the portable device SDA; this received signal strength data is relayed by the portable device SDA to one of the units E1 . . . E4 of the vehicle V.

By using these two parameters (RSS, TOF) and through a predictive artificial intelligence model MOD, it is then possible to accurately locate the portable device SDA around the vehicle V.

To this end, the predictive model MOD has been trained beforehand using pairs of received signal strength RSS and time-of-flight TOF values, which pairs are associated with values indicative of the location d of the portable device SDA.

This training has taken place during a prior phase of calibration of the model MOD, using values taken from tests conducted with reference portable devices SDA, which is to say portable devices that are commercially available.

In this case, the more pairs of values there are for training the model, the more reliable the model.

However, as explained previously, even if the location prediction performed by the predictive model MOD is reliable as regards the reference portable devices SDA, which is to say current portable devices used during the phase of calibration of the artificial intelligence model MOD, the prediction reliability remains uncertain so far as future new models of portable device SDB are concerned.

More particularly, the Applicant Company has noticed a great deal of disparity in the characteristics, such as received signal strength RSS, between new portable devices SDB that have just come to market and the reference portable devices SDA.

In order to overcome this disadvantage of the prior art, an aspect of the invention proposes an adaptive device for activating a vehicle V function. This device D dynamically adapts to any new portable device SDB with which it communicates, even with a new portable device for which the predictive model MOD was not previously trained.

To this end, the adaptive activation device D is suited to:
 a. establishing a bijective function $f_{SDA}$ linking the pairs of predetermined received signal strength values RSS and time-of-flight values TOF used for training the predictive model MOD,
 b. determining whether a received signal is a direct signal, and, for a plurality of direct signals RSS' received from a new portable device SDB:
 c. establishing a new bijective function $f_{SDB}$, using each new pair of values for time-of-flight TOF' and received signal strength RSS',
 d. calculating a received signal strength difference ΔRSS representing the difference between the two bijective functions, for the same time-of-flight TOF1, TOF2,
 e. applying said difference ΔRSS to the received signal strength values RSS of the pairs of predetermined values used for training the model MOD,
 f. determining the location of the new portable device SDB using the new pairs of received signal strength RSS' and time-of-flight TOF' values and by applying the predictive model MOD thus modified,
 g. activating the vehicle function according to the location d thus determined.

Figure 8:
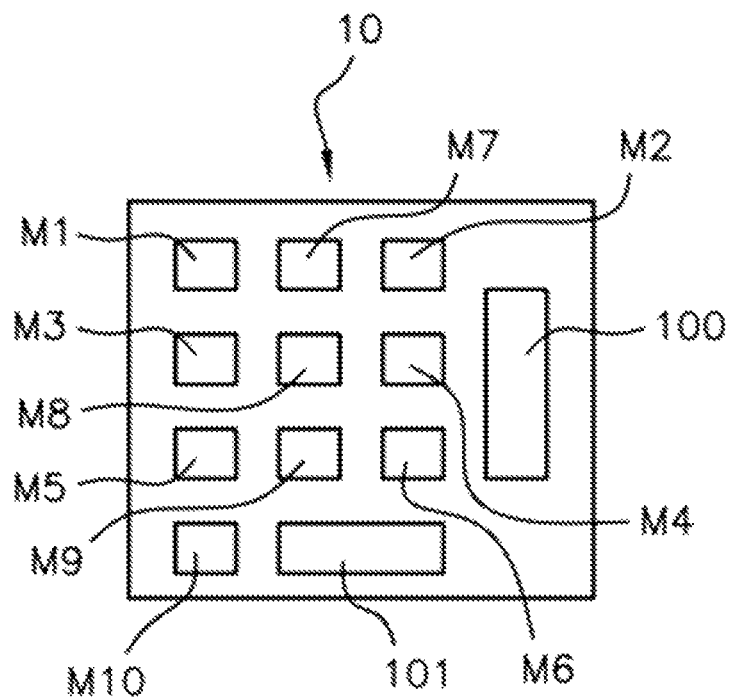
FIG. 8 is a diagram depicting the activation device according to an aspect of the invention.

As illustrated in FIG. 8, the adaptive activation device D thus comprises:
 a. First calculation means M1 for calculating a bijective function $f_{SDA}$ linking the pairs of received signal strength values RSS and time-of-flight values TOF used for training the predictive model,
 b. Means M2 for determining that a signal is characterized as "direct",
 c. Second calculation means M3 for calculating a new bijective function $f_{SDB}$ using the new pairs of received signal strength values RSS' and time-of-flight values TOF' for the direct signals received,
 d. Third calculation means M4 for calculating a received signal strength difference ΔRSS representing the difference between the two bijective functions, for the same time-of-flight TOF1, TOF2,
 e. Means M5 for applying said difference ΔRSS to the received signal strength values RSS of the pairs of predetermined values used for training the model MOD,
 f. Means M6 for determining the location d of the new portable device SDB using the new pairs of received signal strength RSS' and time-of-flight TOF' values and by applying the predictive model thus modified,
 g. Means M7 for activating the vehicle function according to the location d thus determined.

The adaptive activation device D also comprises a processor 100 and a memory 101 (see FIG. 8) that stores instructions that can be used to configure the processor to execute certain special processing operations, in particular to implement the steps of the adaptive method for activating a vehicle function according to the embodiment as described below.

The first calculation means M1, the determining means M2, the second calculation means M3, the third calculation means M4, the application means M5, the determining means M6 and the activation means M7 may take the form of software contained in an integrated circuit of the electronic control unit 10.

In a preferred embodiment of the invention, the adaptive activation device D is further suited to:
a. determining whether a first signal S1 (see FIG. 3) originating from the new portable device SDB and received by an emitter-receiver unit E1 . . . E4 is of maximum strength,
b. comparing an angle α of arrival of the received signal with respect to an antenna of said unit against a window (amin, amax) of predetermined angle values.

In a second embodiment of the invention, said device D is suited to receiving an orientation value OR(θ,φ) originating from the new portable device SDB and verifying that said orientation OR is comprised within a window (ORmin, ORmax) of predetermined orientation values.

Furthermore, in a third and final embodiment of the invention, said device D is suited to comparing the time-of-flight TOF of the signal received by emitter-receiver unit E1 . . . E4 against a maximum time-of-flight value TOFmax.

Of course, the four criteria apply to the same signal that is received by an antenna A1 . . . A4 of a unit E1 . . . E4.

In the preferred embodiment, the device D comprises:
a. Means M7 for determining the strength of a first received signal,
b. Means M8 for comparing an angle α of arrival of the received signal against a window (αmin, αmax) of predetermined angle-of-arrival values.

In the second embodiment, the device D further comprises receiving means (which consist of the emitter-receiver units E1 . . . E4) for receiving an orientation value OR, and means M9 for verifying the orientation OR(θ, φ) of the new portable device with respect to a window (ORmin, ORmax) of predetermined orientation values.

Finally, in the third and last embodiment, the device D comprises means M10 for comparing a time-of-flight TOF of a received signal against a maximum time-of-flight value TOFmax.

Similarly, the determining means M7, the comparison means M8, the verification means M9 and the comparison means M10 may take the form of software contained in an integrated circuit of the electronic control unit 10 (see FIG. 8).

Figure 7:
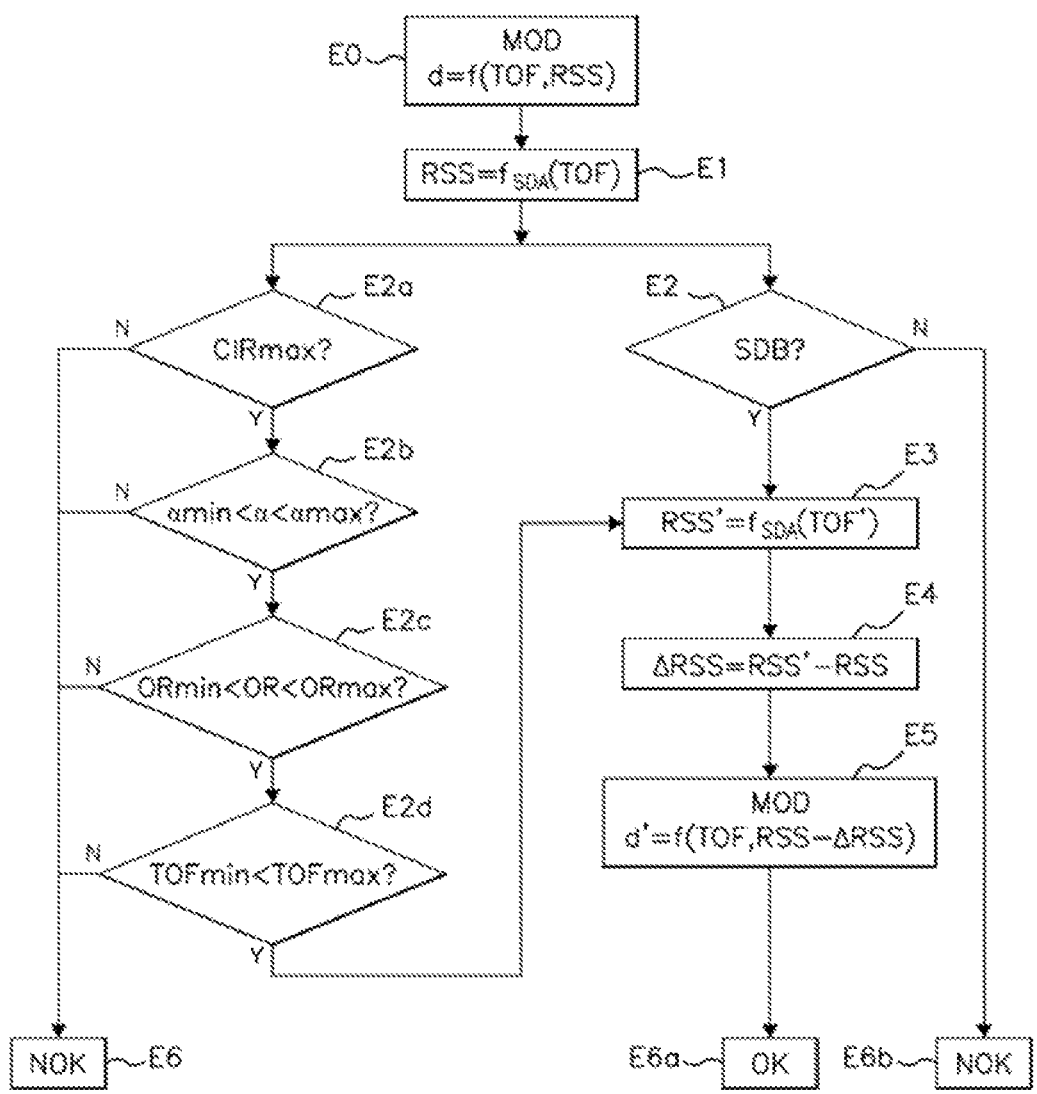
FIG. 7 is a flowchart illustrating the various steps of the adaptive method for activating a vehicle function according to an aspect of the invention.

The adaptive method, illustrated in FIG. 7, for activating a vehicle function will now be described.

During a prior step E0, a predictive location model MOD will have been established on the basis of a database containing pairs of values for received signal strength RSS and time-of-flight TOF, these values originating from reference portable devices SDA.

During this prior phase, for example and nonlimitingly, a neural network of the predictive model would have been trained using said pairs of values (RSS, TOF) where a location value d indicative of the location d of said reference portable device SDA will have been associated with each pair.

Thus, thanks to the artificial intelligence of said neural network, the predictive model MOD is capable of determining the location d of a portable device SDA from a pair of values (RSS, TOF) in a signal sent by said portable device and received by the vehicle V.

According to an aspect of the invention, in a first step E1, a bijective function $f_{SDA}$ linking said signal strength values RSS and the time-of-flight values TOF used for training the predictive model MOD is established. The two parameters are thus correlated through this function.

Figure 6:
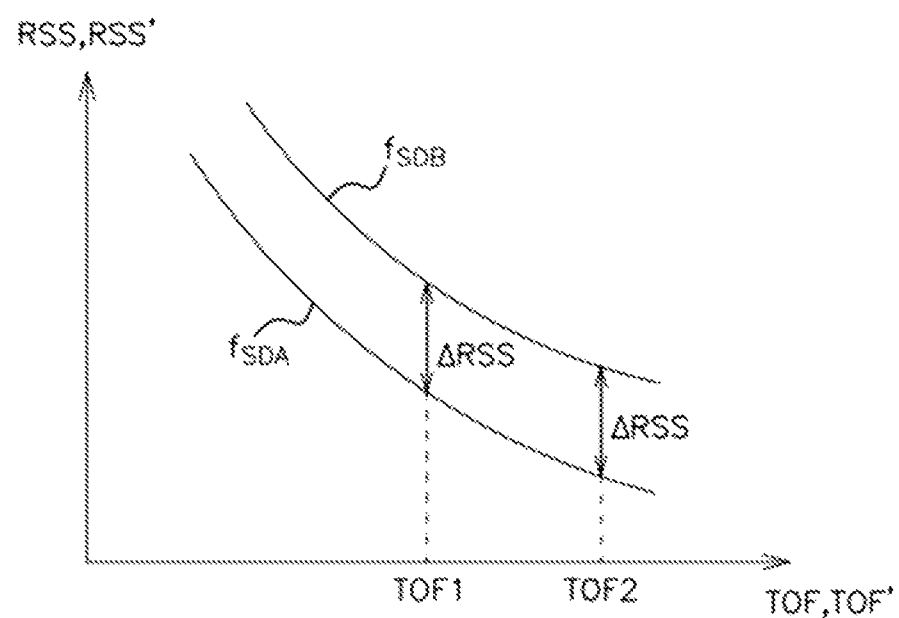
FIG. 6 is a graph depicting the bijective functions linking the received signal strength as a function of the time-of-flight for the reference portable device A and the new portable device B according to the method of an aspect of the invention.

This is illustrated in FIG. 6. For the reference portable devices SDA, a first curve $f_{SDA}$ illustrates the bijective function that links each of the signal strength values RSS to a time-of-flight value TOF for said signal and vice versa.

This bijective function RSS=$f_{SDA}$(TOF) may be determined through the use of any mathematical correlation or regression tool known to those skilled in the art.

In a second step, when a new portable device SDB communicates with the adaptive activation device D, the adaptive method proposes modifying the predictive model to adapt it to the new characteristics of this new portable device SDB. If the signals are not direct, the method ends (step E6b).

In order to perform this dynamic adaptation, the method proposes considering only those signals that are considered as being "direct" which are sent by the new portable device SDB (step E2) and received by an emitter-receiver unit E1, E2, E3, E4 of the vehicle V.

The criteria for making the distinction between a direct signal and an indirect signal according to an aspect of the invention are detailed hereinbelow.

For implementing a preferred embodiment of the method according to an aspect of the invention a signal is referred to here or defined here as being "direct" if it is a signal that meets the following two criteria (see below):
a. The signal S1 has been neither reflected off a wall nor attenuated before being received by an emitter-receiver unit E1 . . . E4, and
b. The signal S1 has been received by the antenna A1 . . . A4 of the emitter-receiver unit E1 . . . E4 within an angle-of-arrival window.

In a second embodiment of the method of the invention, the signal is direct if, in addition to meeting the above two criteria, the received signal was sent while the orientation OR of the new portable device SDB was situated within a window (ORmin, ORmax) of predetermined orientation values And finally, in a third and last embodiment of the method of the invention, the signal is direct if, in addition to meeting the above two criteria, the signal S1 was sent in a close radius of the vehicle, which is to say if the time-of-flight TOF of the signal is lower than a maximum time-of-flight TOFmax.

If the signal S1 received by an emitter-receiver unit is a direct signal, according to the criteria listed above (step E2), then a new bijective function $f_{SDB}$ is established (step E3) this time linking the new pairs of signal strength values RSS' and time-of-flight values TOF' for the signal sent by the new portable device SDB.

This is illustrated in FIG. 6, where the graph $f_{SDB}$ represents the bijective function linking each of the new signal strength values RSS' to the new time-of-flight values TOF' and vice versa.

Next, (step E4) a difference in signal strength ΔRSS, i.e. RSS-RSS', between the two curves $f_{SDA}$ and $f_{SDB}$ for the same time-of-flight values TOF1, TOF2 is calculated (see FIG. 6).

This received signal strength difference ΔRSS is then applied (step E5) to the signal strength values of the pairs of values (RSS, TOF) used in the database for training the predictive model MOD.

The predictive model MOD thus modified therefore adapts to the new input data, in this instance the received signal strength thus corrected (RSS-ΔRSS), and can therefore determine the location d' of the new portable device SDB on the basis of the new values for signal strength RSS' and time-of-flight TOF' originating from said new portable device (step E5).

Depending on the location d', if the new portable device SDB is situated in a predetermined zone ZD, then the vehicle function can be activated (step E6a).

The four criteria used to verify whether a signal is direct will now be described.

In one preferred embodiment of the method according to the invention, a signal S1 sent by the new portable device SDB and received by an emitter-receiver unit E1 . . . E4 is considered to be direct if:
  a. a first signal received by said unit is of maximum strength (step E2a), and
  b. an angle α of arrival of said received signal S1 with respect to the antenna of the unit is comprised within a window (αmin, αmax) of predetermined angle values (step E2b).

Here, the Channel Impulse Response, or CIR, parameter is considered in order to determine the strength of the signals that are relayed by the portable device SDB and received by the emitter-receiver unit E1, E2, E3, E4. This first criterion is known to those skilled in the art.

This parameter known to those skilled in the art is illustrated in FIG. 3. At the top of FIG. 3 there is a graph showing the CIR as a function of time t in instances in which the first signal S1 is a direct signal. It may be seen that the value of the CIR of this first signal S1 is higher than the value of the CIR of the subsequent signals S2, S3 and is a maximum.

At the bottom of FIG. 3 there is a graph showing the CIR as a function of time t in instances in which the first signal S1 is not a direct signal but an indirect signal, which is to say one that has been reflected off a wall (other than the portable device) in its path. It may be seen that the value of the CIR of this first signal S1 is lower than the value of the CIR of the subsequent signals S2, S3 and is not a maximum.

Figure 2:
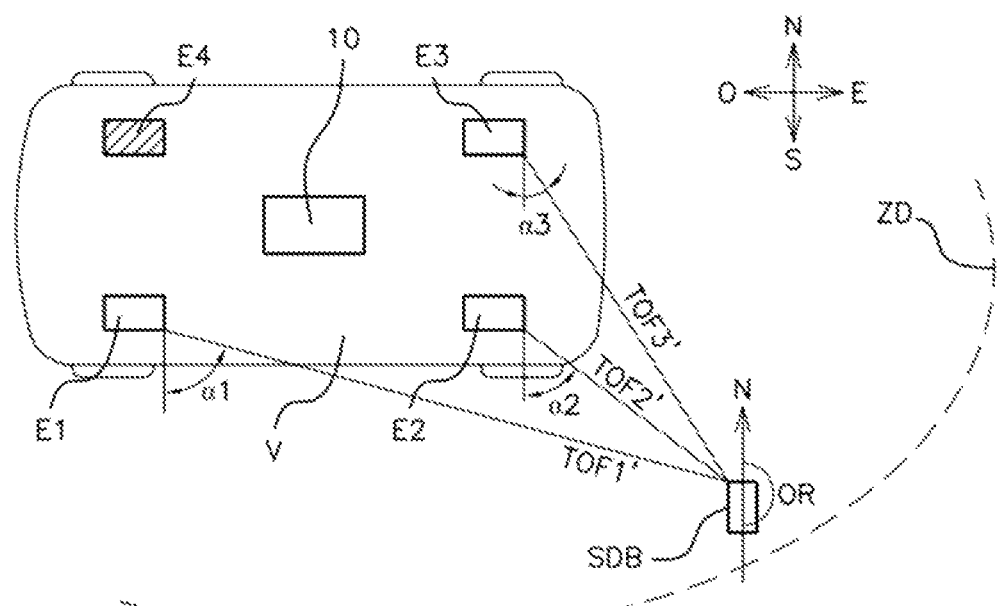
FIG. 2 schematically depicts the second criterion of the method according to an aspect of the invention, namely the angle of arrival of a direct signal exchanged between the portable device and an emitter-receiver situated on the vehicle.

The angle of arrival α is illustrated in FIG. 2. This second criterion is also known to those skilled in the art. Each emitter-receiver unit E1, E2, E3, E4 is able to determine the angle of arrival α1, α2, α3, α4 made between a signal originating from the portable device SDB and its antenna A1, A2, A3, A4. According to an aspect of the invention, a signal is considered to be direct if its angle of arrival is situated within a window [αmin, αmax] of predetermined angle values, for example between αmin=20° and αmax=320°.

In FIG. 2, the three angles of arrival α1, α2, α3 formed between a signal and each of the three antennas A1, A2, A3 of the units are comprised within the window of predetermined angle values.

Note, in FIG. 2, that the emitter-receiver unit E4 is in a shadow zone; it receives a signal originating from the new portable device SDB which is greatly attenuated and which may disrupt the learning of the model MOD, so this indirect signal is therefore set aside and not used for updating the predictive model MOD.

If the first signal S1 has a maximum strength (step E2a), and then if the angle of arrival α of the signal is comprised within a window of predetermined angle values (step E2b), then the method proposes verifying two other criteria: the orientation OR of the new portable device SDB when said signal was emitted, and the time-of-flight TOF of said signal.

As specified earlier, in a preferred embodiment, solely the verifications of the first two criteria suffices, and the method then passes on to steps E3, E4, E5.

In a second embodiment, in addition to the first two criteria, the third criterion regarding the orientation of the new portable device SDB is verified, then the method passes on to steps E3, E4, E5. Else, if at least one of these criteria are not fulfilled the method ends (step E6).

Finally, in the third embodiment, the last two criteria, which are the orientation and the time-of-flight, are further verified in addition to the first two criteria, as detailed hereinabove.

In step E2c, the orientation OR of the new portable device SDB in the four directions with respect to the vehicle V (see FIG. 2) is determined using the sensors installed on board said portable device: gyroscope, magnetometer and accelerometer. The value of the orientation OR is determined using two angles, θ and φ that the orientation vector $\vec{r}$ forms in an orthonormal frame of reference (O, x, y, z) as illustrated to the right of FIG. 4. The orientation OR defined by these two angles OR(θ, φ) is then compared against minimum and maximum orientation values ORmin and ORmax. The Applicant Company has in fact noted that the orientation of the portable device with respect to the vehicle V at the time of emission of the signal had a great deal of impact on the received signal strength.

Figure 4:
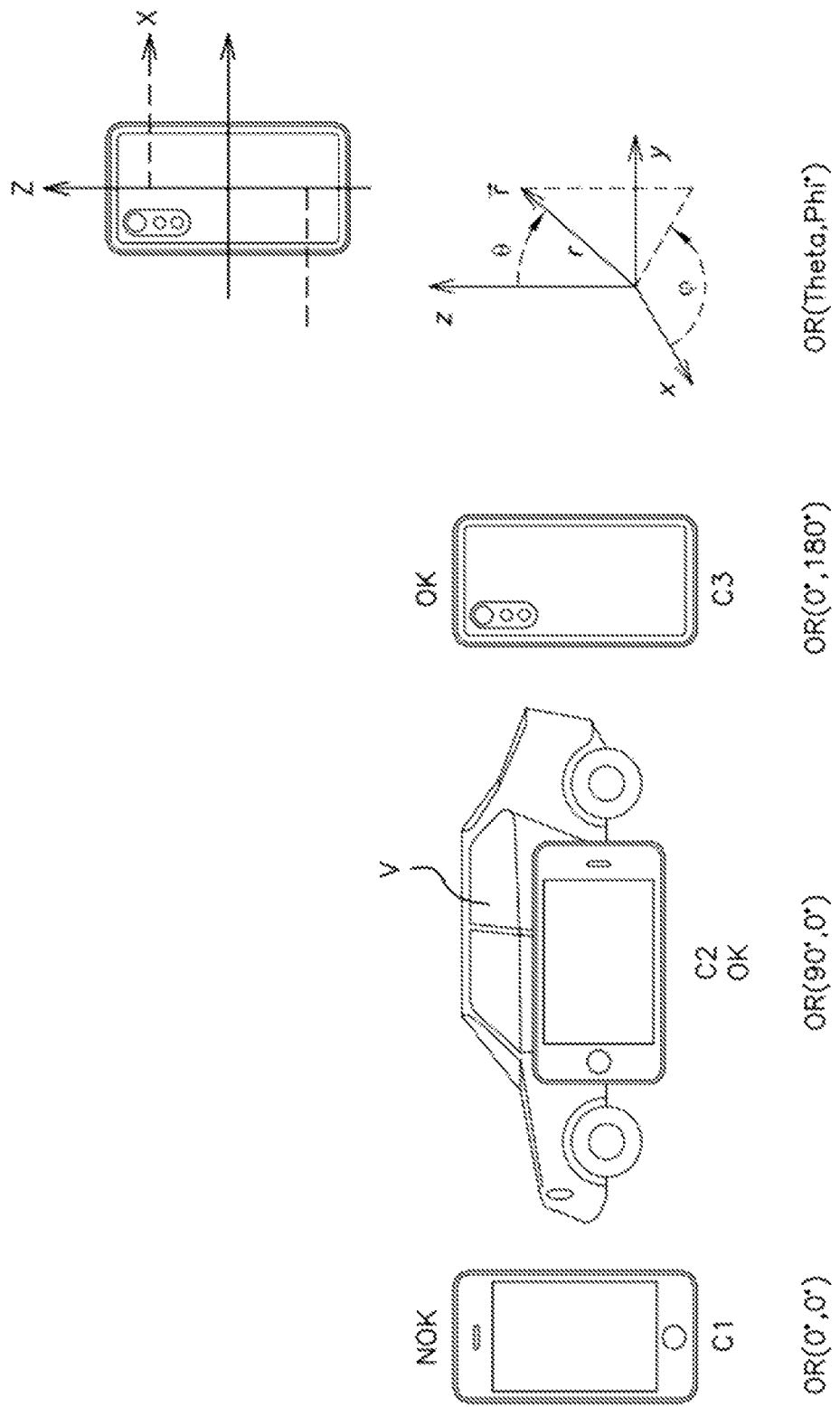
FIG. 4 depicts examples of orientations of portable devices according to the third criterion of the adaptive method for activating a vehicle function according to an aspect of the invention.

This is illustrated in FIG. 4:
  a. a new portable device SDB, the screen of which is oriented toward the vehicle, emits a signal of low strength, this being illustrated by the configuration C3 in FIG. 4 "OK", which corresponds to an orientation with respect to the vehicle in the orthonormal frame of reference (0, x, y, z) of $OR_{C3}$ (0,180),
  b. a new portable device SDB, the screen of which is on the other side from the side facing the vehicle, if it is oriented vertically, emits a signal the strength of which is not indicative of the true distance between said portable device and the vehicle, this being illustrated by the configuration C1 in FIG. 4 "NOK", which corresponds to an orientation with respect to the vehicle in the orthonormal frame of reference (0, x, y, z) of $OR_{C1}$ (0,0),
  c. and finally, a portable device SDB, the screen of which is on the other side from the side facing the vehicle, but, if oriented horizontally, emits a signal of low strength, this being illustrated by the configuration C2 in FIG. 4 "OK", which corresponds to an orientation with respect to the vehicle in the orthonormal frame of reference (0, x, y, z) of $OR_{C2}$(90,0).

If the orientation OR of the portable device SDB lies within the window (ORmin, ORmax) of predetermined orientation values, then in the next step E2d the time-of-flight of the received signal is checked to verify that it is lower than a maximum time-of-flight TOFmax.

Figure 5:
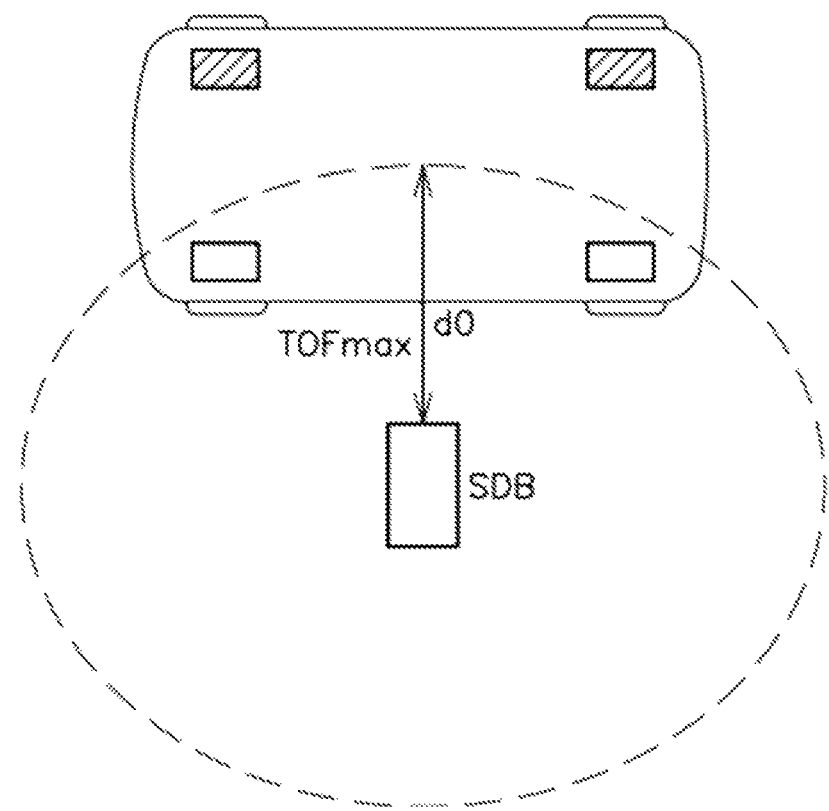
FIG. 5 schematically depicts the fourth criterion of the adaptive method for activating a vehicle function according to an aspect of the invention.

Specifically, the Applicant Company has noted that the higher the time-of-flight value, the less reliable this time-of-flight value is, and the less indicative it is of the true distance do (see FIG. 5) between said new portable device SDB and the vehicle V.

Thus, by setting a maximum time-of-flight TOFmax corresponding, for example, to a distance of 5 meters between said new portable device SDB and the vehicle for all signals received from said new portable device SDB, the method according to an aspect of the invention then makes it possible to ensure that the new values for time-of-flight TOF' and received signal strength RSS' originating from the new portable device SDB are reliable and can be used to update the predictive model MOD.

Once the four criteria have been verified for each received signal, said signal is considered to be a direct signal and the steps E3, E4, E5 are repeated, which is to say that a new bijective function $f_{SDB}$ linking the new received signal strength values RSS' and the new time-of-flight values TOF' received is determined (step E3), then a received signal strength difference ΔRSS between the two bijective functions $f_{SDA}$, $f_{SDB}$ is calculated (step E4) and finally this difference ΔRSS is applied to the received signal strength values that have been used for training the model (step E5), i.e.(RSS-ΔRSS).

Finally, the predictive model MOD thus modified determines the location d' of the new portable device SDB (step E5) on the basis of the new values of received signal strength RSS' and time-of-flight TOF' and then activates the corresponding vehicle function if the new portable device SDB is situated in the predetermined zone ZD.

An aspect of the invention therefore makes it possible to adapt the predictive model for locating a portable device dynamically as signals from a new portable device SDB are progressively received, something that was not possible in the prior art.

The invention is particularly ingenious because it requires only software, and therefore inexpensive, means.

The invention claimed is:

1. An adaptive method for activating a vehicle function using a portable device worn or carried by a user and communicating in ultra-wideband with the vehicle, the function being activated on the basis of a location of the portable device with respect to the vehicle and of authentication of the portable device, the portable device being located using the strength of a signal received by the portable device and using the time-of-flight of a signal exchanged between the portable device and the vehicle and by applying a predictive model trained beforehand using pairs of predetermined received signal strength values and predetermined time-of-flight values from a plurality of reference portable devices, the method comprising:
   a) establishing beforehand a bijective function linking the predetermined received signal strength values and predetermined time-of-flight values used for training the model,
   b) in response to a plurality of signals received from a new portable device, wherein said received signals are direct signals:
      i) establishing a new bijective function using each new pair of values for time-of-flight and received signal strength,
      ii) calculating a received signal strength difference representing the difference between the two bijective functions, for the same time-of-flight,
      iii) applying the calculated received signal strength difference to the received signal strength values of the pairs of predetermined values used for training the model,
      iv) determining the location of the new portable device using the new pairs of received signal strength and time-of-flight values and by applying the predictive model thus modified, and
      v) activating the vehicle function according to the determined location.

2. The adaptive activation method as claimed in claim 1, wherein a signal originating from the new portable device and received by an antenna of an emitter-receiver unit is a direct signal if:
   c) said signal is a first signal of maximum strength, and
   d) an angle of arrival of said received signal is comprised within a window of predetermined angle values.

3. The adaptive activation method as claimed in claim 2, wherein a signal is direct if, further, an orientation of the new portable device with respect to the vehicle upon the emission of said signal is comprised within a window of predetermined orientation values.

4. The adaptive activation method as claimed in claim 2, wherein a signal is direct if, further, the time-of-flight of said signal is below a maximum time-of-flight.

5. An adaptive device for activating a vehicle function, intended to be fitted on board a vehicle and communicating in ultra-wideband with a portable device worn or carried by a user, the function being activated on the basis of a location of the portable device with respect to the vehicle and of authentication of the portable device, the portable device being located using the strength of a signal received by the portable device and using the time-of-flight of a signal exchanged between the portable device and the vehicle and by applying a predictive model trained beforehand using pairs of predetermined received signal strength values and predetermined time-of-flight values from a plurality of reference portable devices, the device configured to:
   a) establish a bijective function linking the predetermined received signal strength values and predetermined time-of-flight values used for training the model,
   b) determine whether a received signal is a direct signal, and, for a plurality of direct signals received from a new portable device:
   c) establish a new bijective function, using each new pair of values for time-of-flight and received signal strength,
   d) calculate a received signal strength difference representing the difference between the two bijective functions, for the same time-of-flight,
   e) apply the calculated received signal strength difference to the received signal strength values of the pairs of predetermined values used for training the model,
   f) determine the location of the new portable device using the new pairs of received signal strength and time-of-flight values and by applying the predictive model thus modified, and
   g) activate the vehicle function according to the determined location.

6. The adaptive activation device as claimed in claim 5, further configured to:
   h) determine whether a first signal received by an antenna of an emitter-receiver unit is of maximum strength, and
   i) compare an angle of arrival of said signal against a window of predetermined angle values.

7. The adaptive activation device as claimed in claim 6, further suited to receiving an orientation of the new portable device (SDB) and verifying that said orientation is comprised within a window of predetermined orientation values.

8. The adaptive activation device as claimed in claim 6 further suited to comparing the time-of-flight of a received signal against a maximum time-of-flight value.

9. A non-transitory computer program product, comprising program code instructions for executing the steps of the method as claimed in claim 1 when said program is executed on a computer.

10. A motor vehicle, comprising an adaptive activation device for activating a vehicle function as claimed in claim 5.

* * * * *